(12) United States Patent
Du et al.

(10) Patent No.: US 10,233,339 B2
(45) Date of Patent: *Mar. 19, 2019

(54) ELECTROPHORETIC MEDIUM COMPRISING A MIXTURE OF CHARGE CONTROL AGENTS

(71) Applicant: E Ink Corporation, Billerica, MA (US)

(72) Inventors: Hui Du, Milpitas, CA (US); Joshua A Ritchey, Melrose, MA (US); Olga Vladimirovna Barykina-Tassa, Boston, MA (US); Vladimir Sofiyev, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,523

(22) Filed: Aug. 6, 2018

(65) Prior Publication Data

US 2018/0340084 A1 Nov. 29, 2018

Related U.S. Application Data

(63) Continuation of application No. 15/707,159, filed on Sep. 18, 2017, now Pat. No. 10,040,954, which is a
(Continued)

(51) Int. Cl.
*G02F 1/167* (2006.01)
*C08F 10/10* (2006.01)
(Continued)

(52) U.S. Cl.
CPC .............. *C09D 5/4407* (2013.01); *C08F 8/44* (2013.01); *C09D 5/448* (2013.01); *G02F 1/167* (2013.01); *G02F 2001/1678* (2013.01)

(58) Field of Classification Search
CPC ....... C09D 5/448; C09D 5/4407; G02F 1/167; G02F 2001/1678; C08F 10/10
See application file for complete search history.

(56) References Cited

U.S. PATENT DOCUMENTS 2,800,457 A 7/1957 Green et al.
2,812,350 A * 11/1957 Niederhauser ......... A01N 33/12
544/108

(Continued)

FOREIGN PATENT DOCUMENTS

DE 910411 C 5/1954
WO 2015140023 A2 9/2015

OTHER PUBLICATIONS

Kitamura, T. et al., "Electrical toner movement for electronic paper-like display", Asia Display/IDW '01, pp. 1517-1520, Paper HCS1-1 (2001).
(Continued)

Primary Examiner — Bijan Ahvazi
(74) Attorney, Agent, or Firm — Brian D. Bean

(57) ABSTRACT

An electrophoretic medium including a mixture of charge control agents, for example quaternary amine salts of polyisobutylene combined with quaternary amine salts of unsaturated monomers. The described electrophoretic medium exhibits improved color saturation as compared to similar electrophoretic media having only one of the charge control agents.

19 Claims, 2 Drawing Sheets

Related U.S. Application Data continuation-in-part of application No. 15/162,838, filed on May 24, 2016, now abandoned.

(60) Provisional application No. 62/167,801, filed on May 28, 2015.

(51) Int. Cl.
  C08F 8/44 (2006.01)
  C09D 5/44 (2006.01)
  G02F 1/1675 (2019.01)

(56) References Cited

U.S. PATENT DOCUMENTS

| | | |
|---|---|---|
| 3,401,119 A | 9/1968 | Froehlich |
| 3,778,371 A | 12/1973 | Malec |
| 4,001,140 A | 1/1977 | Foris |
| 4,273,672 A | 6/1981 | Vassiliades |
| 4,684,596 A | 8/1987 | Bonser |
| 5,380,362 A | 1/1995 | Schubert |
| 5,502,118 A | 3/1996 | Macholdt |
| 5,930,026 A | 7/1999 | Jacobson |
| 6,017,584 A | 1/2000 | Albert |
| 6,113,810 A * | 9/2000 | Hou .............. G02F 1/167 252/572 |
| 6,241,921 B1 | 6/2001 | Jacobson |
| 6,445,489 B1 | 9/2002 | Jacobson |
| 6,504,524 B1 | 1/2003 | Gates |
| 6,512,354 B2 | 3/2003 | Jacobson |
| 6,531,997 B1 | 3/2003 | Gates |
| 6,664,944 B1 | 12/2003 | Albert |
| 6,672,921 B1 | 1/2004 | Liang |
| 6,727,387 B2 | 4/2004 | Mukkamala |
| 6,727,873 B2 | 4/2004 | Gordon, II |
| 6,753,999 B2 | 6/2004 | Zehner |
| 6,788,449 B2 | 9/2004 | Liang |
| 6,822,782 B2 | 11/2004 | Honeyman |
| 6,825,970 B2 | 11/2004 | Goenaga |
| 6,839,158 B2 | 1/2005 | Albert |
| 6,864,875 B2 | 3/2005 | Drzaic |
| 6,866,760 B2 | 3/2005 | Paolini, Jr. |
| 6,900,851 B2 | 5/2005 | Morrison |
| 6,905,807 B2 | 6/2005 | Morrison |
| 6,922,276 B2 | 7/2005 | Zhang |
| 6,930,818 B1 | 8/2005 | Liang |
| 6,950,220 B2 | 9/2005 | Abramson et al. |
| 6,982,178 B2 | 1/2006 | LeCain et al. |
| 6,995,550 B2 | 2/2006 | Jacobson |
| 7,002,728 B2 | 2/2006 | Pullen |
| 7,012,600 B2 | 3/2006 | Zehner |
| 7,023,420 B2 | 4/2006 | Comiskey |
| 7,034,783 B2 | 4/2006 | Gates |
| 7,075,502 B1 | 7/2006 | Drzaic |
| 7,116,318 B2 | 10/2006 | Amundson |
| 7,116,466 B2 | 10/2006 | Whitesides |
| 7,119,772 B2 | 10/2006 | Amundson |
| 7,167,155 B1 | 1/2007 | Albert |
| 7,170,670 B2 | 1/2007 | Webber |
| 7,193,625 B2 | 3/2007 | Danner |
| 7,202,847 B2 | 4/2007 | Gates |
| 7,236,291 B2 | 6/2007 | Kaga et al. |
| 7,259,744 B2 | 8/2007 | Arango |
| 7,304,787 B2 | 12/2007 | Whitesides |
| 7,312,784 B2 | 12/2007 | Baucom |
| 7,312,794 B2 | 12/2007 | Zehner |
| 7,321,459 B2 | 1/2008 | Masuda |
| 7,327,511 B2 | 2/2008 | Whitesides |
| 7,339,715 B2 | 3/2008 | Webber |
| 7,411,719 B2 | 8/2008 | Paolini, Jr. |
| 7,420,549 B2 | 9/2008 | Jacobson |
| 7,453,445 B2 | 11/2008 | Amundson |
| 7,485,368 B2 | 2/2009 | Minami |
| 7,492,339 B2 | 2/2009 | Amundson |
| 7,492,505 B2 | 2/2009 | Liang |
| 7,499,211 B2 | 3/2009 | Suwabe |
| 7,528,822 B2 | 5/2009 | Amundson |
| 7,535,624 B2 | 5/2009 | Amundson et al. |
| 7,545,358 B2 | 6/2009 | Gates |
| 7,561,324 B2 | 7/2009 | Duthaler et al. |
| 7,583,251 B2 | 9/2009 | Arango |
| 7,602,374 B2 | 10/2009 | Zehner |
| 7,612,760 B2 | 11/2009 | Kawai |
| 7,667,684 B2 | 2/2010 | Jacobson |
| 7,679,599 B2 | 3/2010 | Kawai |
| 7,679,814 B2 | 3/2010 | Paolini, Jr. |
| 7,688,297 B2 | 3/2010 | Zehner |
| 7,729,039 B2 | 6/2010 | LeCain et al. |
| 7,733,311 B2 | 6/2010 | Amundson |
| 7,733,335 B2 | 6/2010 | Zehner |
| 7,767,112 B2 | 8/2010 | Hou |
| 7,787,169 B2 | 8/2010 | Abramson et al. |
| 7,791,789 B2 | 9/2010 | Albert |
| 7,839,564 B2 | 11/2010 | Whitesides et al. |
| 7,848,009 B2 | 12/2010 | Machida |
| 7,885,457 B2 | 2/2011 | Hirano |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |
| 7,992,990 B2 | 8/2011 | Yamashita |
| 7,999,787 B2 | 8/2011 | Amundson |
| 8,009,348 B2 | 8/2011 | Zehner |
| 8,023,176 B2 | 9/2011 | Akashi |
| 8,031,392 B2 | 10/2011 | Hiji |
| 8,040,594 B2 | 10/2011 | Paolini, Jr. |
| 8,054,526 B2 | 11/2011 | Bouchard |
| 8,077,141 B2 | 12/2011 | Duthaler |
| 8,098,418 B2 | 1/2012 | Paolini, Jr. |
| 8,125,501 B2 | 2/2012 | Amundson |
| 8,139,050 B2 | 3/2012 | Jacobson |
| 8,174,490 B2 | 5/2012 | Whitesides |
| 8,174,491 B2 | 5/2012 | Machida |
| 8,199,395 B2 | 6/2012 | Whitesides |
| 8,213,076 B2 | 7/2012 | Albert |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,363,299 B2 | 1/2013 | Paolini, Jr. |
| 8,363,306 B2 | 1/2013 | Du |
| 8,384,658 B2 | 2/2013 | Albert |
| 8,441,714 B2 | 5/2013 | Paolini, Jr. |
| 8,441,716 B2 | 5/2013 | Paolini, Jr. |
| 8,449,096 B2 | 5/2013 | Birau |
| 8,466,852 B2 | 6/2013 | Drzaic |
| 8,496,324 B2 | 7/2013 | Anthony |
| 8,542,431 B2 | 9/2013 | Shuto |
| 8,558,783 B2 | 10/2013 | Wilcox |
| 8,558,785 B2 | 10/2013 | Zehner |
| 8,576,470 B2 | 11/2013 | Paolini, Jr. |
| 8,576,476 B2 | 11/2013 | Telfer |
| 8,587,859 B2 | 11/2013 | Kayashima |
| 8,593,721 B2 | 11/2013 | Albert |
| 8,652,245 B2 | 2/2014 | Liu |
| 8,704,754 B2 | 4/2014 | Machida |
| 8,717,664 B2 | 5/2014 | Wang |
| 8,730,216 B2 | 5/2014 | Mizutani |
| 8,730,559 B2 | 5/2014 | Akashi |
| 8,797,634 B2 | 8/2014 | Paolini, Jr. |
| 8,830,559 B2 | 9/2014 | Honeyman |
| 8,873,129 B2 | 12/2014 | Bouchard |
| 8,902,153 B2 | 12/2014 | Bouchard |
| 8,917,439 B2 | 12/2014 | Wang |
| 8,928,562 B2 | 1/2015 | Gates |
| 8,964,282 B2 | 2/2015 | Wang |
| 9,005,494 B2 | 4/2015 | Valianatos |
| 9,116,412 B2 | 8/2015 | Lin |
| 9,152,005 B2 | 10/2015 | Morikawa et al. |
| 9,170,467 B2 | 10/2015 | Whitesides |
| 9,199,441 B2 | 12/2015 | Danner |
| 9,230,492 B2 | 1/2016 | Harrington |
| 9,293,511 B2 | 3/2016 | Jacobson |

(56) References Cited

U.S. PATENT DOCUMENTS

| | | | |
|---|---|---|---|
| 9,348,193 B2 | 5/2016 | Hiji | |
| 9,412,314 B2 | 8/2016 | Amundson | |
| 9,429,810 B2 | 8/2016 | Kaino | |
| 9,672,766 B2 | 6/2017 | Sjodin | |
| 9,966,018 B2 | 5/2018 | Gates | |
| 10,040,954 B2 | 8/2018 | Du | |
| 2001/0039879 A1* | 11/2001 | Chapman | B01D 39/083 96/69 |
| 2003/0013769 A1* | 1/2003 | Mukkamala | A01N 33/12 514/642 |
| 2003/0102858 A1 | 6/2003 | Jacobson | |
| 2005/0253777 A1 | 11/2005 | Zehner | |
| 2005/0267235 A1* | 12/2005 | Minami | C08F 2/48 523/201 |
| 2007/0091418 A1 | 4/2007 | Danner | |
| 2007/0103427 A1 | 5/2007 | Zhou et al. | |
| 2008/0024429 A1 | 1/2008 | Zehner | |
| 2008/0024482 A1 | 1/2008 | Gates | |
| 2008/0043318 A1 | 2/2008 | Whitesides | |
| 2008/0048970 A1 | 2/2008 | Drzaic | |
| 2008/0113890 A1 | 5/2008 | Moreton | |
| 2008/0136774 A1 | 6/2008 | Harris | |
| 2008/0291129 A1 | 11/2008 | Harris | |
| 2009/0174651 A1 | 7/2009 | Jacobson | |
| 2009/0225398 A1 | 9/2009 | Duthaler | |
| 2009/0322721 A1 | 12/2009 | Zehner | |
| 2010/0060628 A1 | 3/2010 | Lenssen et al. | |
| 2010/0156780 A1 | 6/2010 | Jacobson | |
| 2010/0220121 A1 | 9/2010 | Zehner | |
| 2010/0265561 A1 | 10/2010 | Gates et al. | |
| 2011/0175939 A1 | 7/2011 | Moriyama | |
| 2011/0193840 A1 | 8/2011 | Amundson | |
| 2011/0193841 A1 | 8/2011 | Amundson | |
| 2011/0199671 A1 | 8/2011 | Amundson | |
| 2011/0242641 A1* | 10/2011 | Du | C09C 1/3684 359/296 |
| 2011/0263779 A1 | 10/2011 | Murofushi | |
| 2012/0118198 A1 | 5/2012 | Zhou | |
| 2012/0129092 A1 | 5/2012 | Chun | |
| 2012/0252960 A1 | 10/2012 | Chun | |
| 2012/0293858 A1 | 11/2012 | Telfer | |
| 2012/0326957 A1 | 12/2012 | Drzaic | |
| 2013/0194250 A1 | 8/2013 | Amundson | |
| 2013/0222884 A1 | 8/2013 | Moriyama | |
| 2013/0222886 A1 | 8/2013 | Kawahara | |
| 2013/0222887 A1 | 8/2013 | Nakayama | |
| 2013/0222888 A1 | 8/2013 | Urano | |
| 2014/0011913 A1 | 1/2014 | Du | |
| 2016/0349593 A1 | 12/2016 | Du | |

OTHER PUBLICATIONS

Yamaguchi, Y. et al., "Toner display using insulative particles charged triboelectrically", Asia Display/IDW '01, pp. 1729-1730, Paper AMD4-4 (2001).

Heikenfeld, J. et al., "A critical review of the present and future prospects for electronic paper", SID, 19(2), pp. 129-156 (2011).

Gutcho, M.H., Microcapsules and MIcroencapsulation Techniques, Noyes Data Corp., Park Ridge NJ, (1976).

Vandegaer, J.E. (ed.), "Microencapsulation Processes and Applications", pp. v-x, 1-180 (Plenum Press, New York 1974).

Database Registry (on-line) RN736093-83-7.

Russian Federal Institute of Industrial Property; PCT/US2016/033888; International Search Report and Written Opinion; dated Sep. 1, 2016.

* cited by examiner

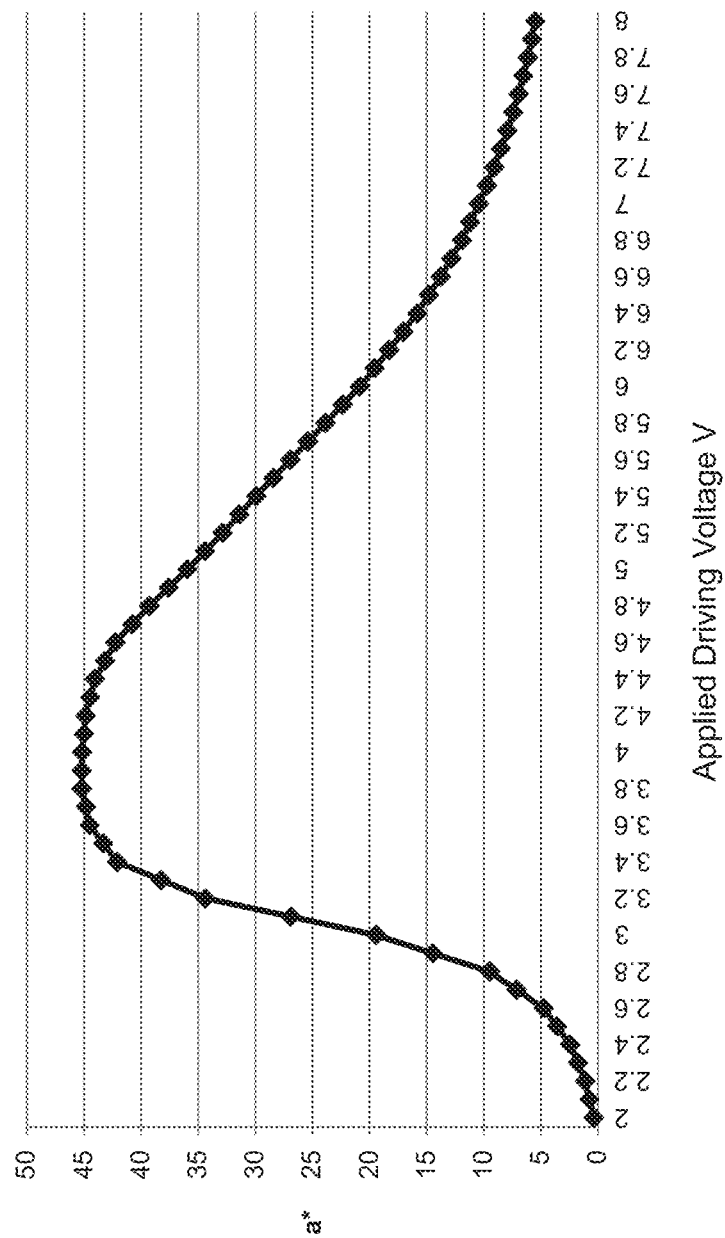

ELECTROPHORETIC MEDIUM COMPRISING A MIXTURE OF CHARGE CONTROL AGENTS

RELATED APPLICATIONS

This application is a continuation of U.S. patent application Ser. No. 15/707,159, filed Sep. 18, 2017, now U.S. Pat. No. 10,040,954, which is a continuation-in-part of U.S. patent application Ser. No. 15/162,838, filed May 24, 2016, and published as US 2016/0349593, now abandoned, which claims priority to U.S. Provisional Application No. 62/167,801, filed May 28, 2015. The contents of all of the aforementioned applications and any other patent or application mentioned below is incorporated herein by reference in its entirety.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

Alternatively, an electrophoretic fluid may have two (or more) sets of pigment particles of contrasting colors and carrying varying charges. Typically the sets of pigment particles are dispersed in a clear solvent or solvent mixture. In the case of t, when a voltage difference is imposed between the two electrode plates, the two types of pigment particles would move to opposite ends. Thus one of the colors of the two types of pigment particles would be seen at the viewing side.

An electrophoretic fluid may also comprise multiple types of charged pigment particles of different optical characteristics. The different types of charged pigment particles have different charge polarities and/or charge levels. Such a fluid may allow a display device to display multiple color states.

The charge behavior of each type of pigment particles depends on both the particle surface chemistry and the presence of charge control agent(s) in the fluid. The charge control agent in fact plays a critical role in controlling the optical performance of a display device.

SUMMARY OF THE INVENTION

Charge control agents have been added to electrophoretic media for some time. However, it has been discovered that certain mixtures of charge control agents have performance beyond what is expected by simply adding an equivalent amount of charge control agent as a percent weight of the electrophoretic medium. In particular, electrophoretic media including a mixture of quaternary amine charge control agents, have been shown to produce much better color saturation in electrophoretic media. Accordingly, the invention is an electrophoretic medium including a first set of charged particles, a non-polar fluid, a first charge control agent comprising a quaternary amine and a branched hydrocarbon tail of between 20 and 1000 carbon atoms in length, and a second charge control agent comprising a quaternary amine and a linear polyisobutylene tail of between 12 and 500 carbon atoms in length. Often the first charge control agent comprises a polymeric tail formed from monomers, each monomer being at least 14 carbon atoms in length. In some embodiments, each monomer comprises at least one carbon-carbon double bond. For example, the branched hydrocarbon tail of the first charge control agent may include a polyester or a poly secondary alcohol. In many embodiments, the second charge control agent comprises a species of $(CH_3)_3C-[-CH_2-C(CH_3)_2-]_n-L-NR_1R_2R_3^+ X^-$, wherein L is a linking moiety, $R_1$, $R_2$ and $R_3$ are independently alkyl having 1-4 carbon atoms, n is an integer from 2 to 40, for example between 5 and 20, and $X^-$ is a counter ion. Typically, the total concentration of both the first and second charge control agents is between 0.05% and 0.6% by weight of the electrophoretic medium. Often, the ratio of first charge control agents to second charge control agents is from 5:1 to 1:5, for example from 2:1 to 1:2. The mixed charge control agents may be used with any electrophoretic media, however, the effects appear to be most pronounced in colored electrophoretic media, i.e., including at least three sets of charged particles, wherein at least one set of charged particles is not white and not black, for example, red or yellow.

BRIEF DESCRIPTION OF THE DRAWINGS

FIG. 1A is an embodiment illustrating a "voltage insensitive range" for an electrophoretic fluid of the invention.

DETAILED DESCRIPTION OF THE INVENTION

Figure 1B:
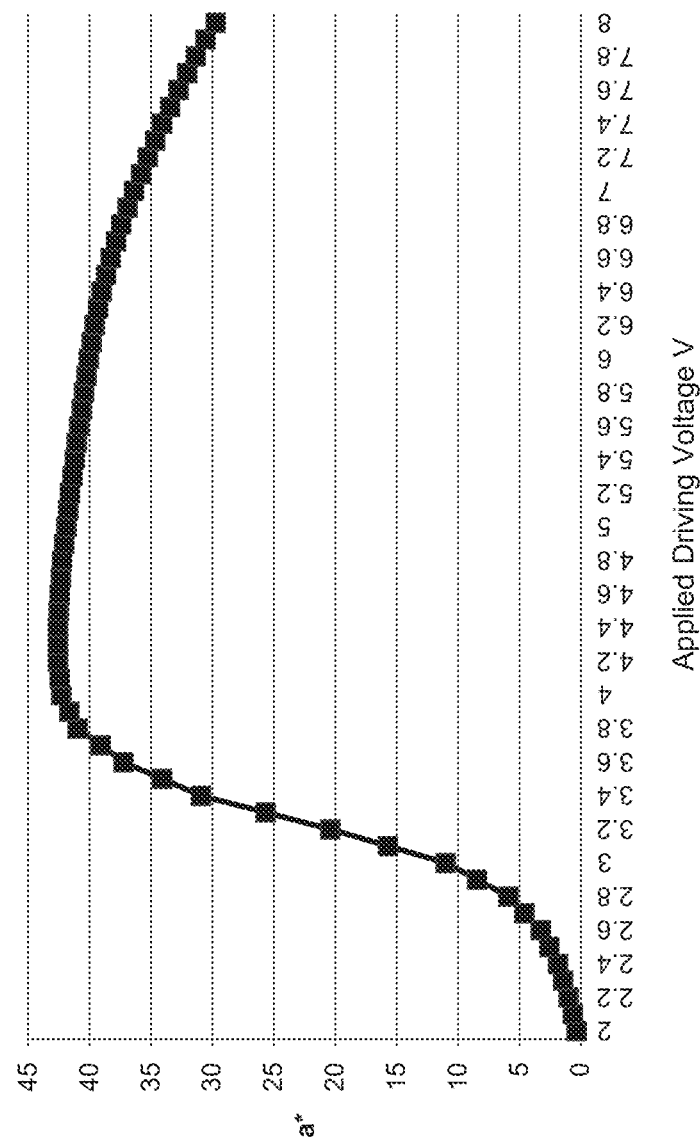
FIG. 1B is an embodiment illustrating a "voltage insensitive range" for an electrophoretic fluid of the invention.

Electrophoretic mixtures of the invention provide for improved performance in electrophoretic media. In particular, the color saturation of non-white and non-black colored particles can be doubled with the described mixtures of charge control agents. The mixture of charge control agents typically comprises different types of quaternary amine charge control agents, where some of the quaternary amines are bonded to branched hydrocarbons with long tails, and some of the quaternary amines are bonded to linear polyisobutylenes. Suitable long, branched quaternary amines include the SOLSPERSE™ line of charge control agents (Lubrizol). Suitable polyisobutylene quaternary amines can be prepared from commercial polyisobutylene mixtures, such as KEROCOM® polyisobutylene mixtures (BASF) using the synthetic methods described below.

Charge control agents often charge the particles by poorly understood and uncontrolled processes, and can lead to undesirably high conductivity of the electrophoretic medium. Also, since the charge control agent is only physically adsorbed on to the particles and is not bound thereto, changes in conditions may cause partial or complete desorption of the charge control agent from the particles, with consequent undesirable changes in the electrophoretic characteristics of the particles. The desorbed charge control agent might resorb on to other surfaces within the electrophoretic medium, and such resorption has the potential for causing additional problems.

The use of charge control agents is especially difficult in dual particle electrophoretic media, where a charge control agent may adsorb on to the surface of one or both types of electrophoretic particles. Indeed, the present inventors have observed cases where the addition of a charge control agent to a dual particle electrophoretic medium, which was intended to be of the type in which the two types of particles bear charges of opposite polarity, resulted in some particles of one type becoming positively charged, and other particles of the same type becoming negatively charged, thus rendering the medium essentially useless for its intended purpose. In the case of an encapsulated dual particle electrophoretic medium, it is also possible for the charge control agent to adsorb on to the capsule wall. Providing charged groups within the bound polymer ensures that these charged groups remain fixed on to the particle, with essentially no tendency to desorb (unless the polymer chains themselves are rendered capable of desorption, as already discussed).

In addition to improving the color saturation of certain electrophoretic media, the mixed charge control agents described herein also extend the range of voltages over which the electrophoretic medium achieves good switching. This feature is very important for implementing electrophoretic displays in simple devices that do not have voltage regulation, for example battery-powered electronic shelf labels. FIG. 1A shows the relationship between applied driving voltage (V) and the optical performance of a display device. The optical performance is expressed in the a* value, utilizing the L*a*b* color system. At a red color state, a higher a* value is indicative of higher color quality.

The maximum a* in FIG. 1A appears at the applied driving voltage V being about 3.8V. However, if a change of +0.5V is made to the applied driving voltage, the resulting a* value would be about 37 which is roughly 90% of the maximum a*, thus still acceptable. This tolerance can be beneficial to accommodate changing of the driving voltages caused by, for example, variation in the electronic components of a display device, drop of battery voltage over time, batch variation of the TFT backplanes, batch variation of the display devices or temperature and humidity fluctuations.

If any of the driving voltages in a particular range is applied which does not significantly affect the optical performance (i.e., within 90% of the maximum performance) of a display device, such a range is referred to as a "voltage-insensitive range" in the present application. The larger the "voltage insensitive" range, the more tolerant the optical performance is to batch variations and environmental changes. FIG. 1B demonstrates a wider voltage insensitive range, as in this case, the range [(i.e., 2.8V=(3.7V to 6.5V)] is twice the width of the voltage-insensitive range in FIG. 1A [(i.e., 1.4V=(3.3V to 4.7V)].

The improved electrophoretic media includes a non-polar fluid, a plurality of first charged particles, and a mixture of charge control agents that include quaternary amines. A first charge control agent includes branched hydrocarbon tail of between 20 and 1000 carbon atoms in length. For example, the first charge control agent may have an unsaturated polymeric tail comprising monomers of at least 10 carbon atoms in length. A second charge control agent includes a linear polyisobutylene tail of between 12 and 500 carbon atoms in length. The charge control agents may form complexes with the first charged particles. Typically the electrophoretic medium will include multiple types of charged pigment particles, each of which may have different charge and mobility properties from the other particles, as well as differing colors (e.g., white, black, red, yellow, green, blue, cyan, or magenta). In some embodiments, additional, e.g., third types of charge control agents may be present. In many embodiments, the ratio of charge control agent to first charged particles is greater than 1:1000 (wt./wt.), e.g., greater than 1:500 (wt./wt.), e.g., greater than 1:300 (wt./wt.), e.g., greater than 1:200 (wt./wt.), e.g., greater than 1:100 (wt./wt.).

The first charge control agents, including a quaternary amine and a branched polymeric tail. The tail may comprise monomers of at least 10 carbon atoms in length, and each monomer may include double bonds. For example, the polymeric tail may be the condensation product of an unsaturated carboxylic acid monomer having a secondary alcohol. The resulting polymer will include a backbone of repeating alkene units as well as pendant alkyl chains (i.e., a comb polymer). Other polymeric tails, derived from other saturated or unsaturated monomers, are also suitable for use with the invention. In some embodiments, the polymer tail may be the condensation product of an unsaturated carboxylic acid monomer having a primary alcohol. In some embodiments, the polymer tail may be the condensation product of an unsaturated carboxylic acid monomer having a tertiary alcohol.

The second charge control agent of the electrophoretic medium is a polyisobutylene derivative quaternary amine, e.g., a salt, expressed by the following formula (I):

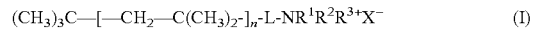

$(CH_3)_3C-[-CH_2-C(CH_3)_2-]_n-L-NR^1R^2R^{3+}X^-$ (I)

Formula (I) has a polyisobutylene derivative moiety with a quaternary amine as an end-functionality. The molecular weight of the compound may be in the range of 300-3000, preferably in the range of 500-2000, and n is an integer from 2 to 40. L is a linking chain which may be a saturated or unsaturated alkylene or amide-alkylene chain of 2 to 6 carbon atoms, such as —CRR—CR=CR—CRR—, —CRR—CRR—CRR— or —NHC(O)—CRR—CRR—CRR— wherein the R's are independently hydrogen or an alkyl of 1-4 carbon atoms. For example, L may be —CH$_2$—CH$_2$—CH$_2$—, —CH$_2$—CH=CH—CH$_2$—, —CH$_2$—CH$_2$—CH(CH$_3$)—, —CH$_2$—CH(CH$_3$)—CH$_2$— or —NHC(O)—CH$_2$—CH$_2$—CH$_2$—. $R^1$, $R^2$ and $R^3$ are independently an alkyl of 1-4 carbon atoms.

X— is a counter ion. Examples of preferred counter ion include F$^-$, Cl$^-$, Br$^-$, I$^-$, R'SO$_3^-$, R'SO$_4^-$ or R'CO$_3^-$, wherein R' is an alkyl of 1-4 carbon atoms or an aryl of 6 to 18 carbon atoms optionally substituted with an alkyl of 1-4 carbon atoms. In one embodiment, the counter ion is R'SO$_4^-$ wherein R' is an alkyl of 1-4 carbon atoms, preferably a methyl. In another embodiment, the counter ion is R'SO$_3^-$ wherein R' is a phenyl optionally substituted with an alkyl of 1-4 carbon atoms, preferably a methyl. In another embodiment, the counter ion is a halogen, such as F$^-$, Cl$^-$, Br$^-$ or I$^-$. In an electrophoretic fluid, the concentration of the charge control agent of the present invention may be in the range of 0.05%-0.6% by weight, preferably 0.05% to 0.4% by weight, more preferably 0.1% to 0.3% by weight. The ratio of the first charge control agent to the second charge control agent is typically from 5:1 to 1:5, e.g., from 2:1 to 1:2. In some embodiments, the ratio is about 1:1.

Electrophoretic media of the invention are typically encapsulated when used in a display to improve the switching speed and to discourage gravitational settling. The electrophoretic media may be encapsulated in microcells or a protein coacervate, such as a coacervate comprise gelatin. In other embodiments, the electrophoretic media are dispersed, as a suspension, in a polymer. When incorporated into a display, the encapsulated medium may have a dynamic range of 55L* at 0° C. when driven by a 15V, 500 ms drive pulse.

As described previously, charge control agents comprising a quaternary amine and tails of various structures. Quaternary amines comprise a quaternary ammonium cation [—$NR^1R^2R^3$]$^+$ bonded to an organic molecule, for example an alkyl group or an aryl group. Quaternary amine charge control agents may include a long non-polar tail attached to the charged ammonium cation, such as the families of fatty acid quaternary amines offered by Akzo Nobel under the tradenames ARQUAD®. The quaternary amine charge control agents may be purchased in a purified form, or the charge control agents may be purchased as a reaction product that has formed a quaternary amine charge control agent. For example, SOLSPERSE™ 17000 or SOLSPERSE™ 1900 (Lubrizol Corporation), may be purchased as a reaction product of 12-hydroxy-octadecanoic acid homopolymer with N,N-dimethyl-1,3-propanediamine and methylbisulfate.

In preferred embodiments, the non-polar tail of the quaternary amine charge control agents are unsaturated, i.e., they have at least one carbon-carbon double bond. Unexpectedly, when unsaturated quaternary amine charge control agents are incorporated into electrophoretic media, the media has improved switching speeds, especially at low temperatures. In some embodiments, the non-polar tail of the quaternary amine charge control agents is formed from a polymeric or oligomeric compound, such as a polyester. In some instances, the polyester may be formed via a condensation reaction of carboxylic acid, e.g., a fatty acid, having a secondary amine. In such instances, the condensation reaction will result in repeating units having at least one carbon-carbon double bond (i.e., unsaturated), with repeating pendant carbon chains, which may be saturated or unsaturated. Such unsaturated polymeric quaternary amine charge control agents are commercially available from Lubrizol under the tradenames SOLSPERSE 19000 and SOLSPERSE 16000. The overall length of the monomer from which the tail is formed is at least 10 carbon atoms in length, for example 14 carbon atoms in length, for example 18 carbon atoms in length. The charge control agents may be added to the electrophoretic medium at a concentration of greater than 1 g of charge control agent for every 100 g of charged particles. For example, the charge control agent to charged particle ratio may be 1:30 (wt./wt.), e.g., 1:25 (wt./wt.), e.g., 1:20 (wt./wt.). The charge control agents may have an average molecular weight of greater than 12,000 grams/mole, e.g., greater than 13,000 grams/mole, e.g., greater than 14,000 grams/mole, e.g., greater than 15,000 grams/mole, e.g., greater than 16,000 grams/mole, e.g., greater than 17,000 grams/mole, e.g., greater than 18,000 grams/mole, e.g., greater than 19,000 grams/mole, e.g., greater than 20,000 grams/mole, e.g., greater than 21,000 grams/mole. For example, the average molecular weight of the charge control agent may be between 14,000 grams/mole and 22,000 grams/mole, e.g., between 15,000 grams/mole and 20,000 grams/mole. In some embodiments, the charge control agents have an average molecular weight of about 19,000 grams/mole.

Additional charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

In addition to using the mixture of charge control agents described above, it may be very convenient to treat the particles (after any preliminary treatment such as silica coating) with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture. Examples of reagents which provide chargeable sites but not polymerizable or polymerization-initiating groups include 3-(trimethoxysilyl)propylamine, N-[3-(trimethoxysilyl)propyl] diethylenetriamine, N-[3-(trimethoxysilyl)propyl]ethylene and 1-[3-(trimethoxysilyl)propyl]urea; all these silane reagents may be purchased from United Chemical Technologies, Inc., Bristol, Pa., 19007. As already mentioned, an example of a reagent which provides polymerizable groups but not charged or chargeable groups is 3-(trimethoxysilyl)propyl methacrylate.

The charged particle CCA complexes formed may be used with advantage in all of the types of electrophoretic display (namely single particle, opposite charge dual particle, same polarity dual particle and polymer dispersed) previously described. However, the charged particle CCA complexes of the present invention are especially useful in opposite charge dual particle electrophoretic displays, which are especially difficult to stabilize, since as already mentioned the two types of particles of opposite polarity are inherently attracted towards one another and hence have a strong tendency to form aggregates which may interfere with the electrophoretic operation of the display. The described charged particle CCA complexes may be used to construct an electrophoretic medium having only one type of particle, such as used in a variable transmission window. The described charged particle CCA complexes may be used to construct an electrophoretic medium to be used in black/white displays, i.e., including black particles and white particles. The described charged particle CCA complexes may be used to construct an electrophoretic medium to be used in colors displays, i.e., including, for example, three, four, five, six, seven, or eight different types of particles. For examples, a display may be constructed where the particles include black, white, and red or black, white, and yellow. Alternatively, the display may include red, green, and blue particles, or cyan, magenta, and yellow particles, or red, green, blue, and yellow particles.

Non-Polar Fluids

As already indicated, the suspending fluid containing the particles should be chosen based on properties such as density, refractive index, and solubility. A preferred suspending fluid has a low dielectric constant (about 2), high volume resistivity (about 1015 ohm-cm), low viscosity (less than 5 centistokes ("cst.")), low toxicity and environmental impact, low water solubility (less than 10 parts per million ("ppm.")), high specific gravity (greater than 1.5), a high boiling point (greater than 90° C.), and a low refractive index (less than 1.2).

The choice of non-polar fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Non-polar organic solvents, such as halogenated organic solvents, saturated linear or branched hydrocarbons, silicone oils, and low molecular weight halogen-containing polymers are some useful non-polar fluids. The non-polar fluid may comprise a single fluid. The non-polar fluid will, however, often be a blend of more than one fluid in order to tune its chemical and physical properties. Furthermore, the non-polar fluid may contain additional surface modifiers to modify the surface energy or charge of the electrophoretic particle or bounding capsule. Reactants or solvents for the microencapsulation process (oil soluble monomers, for example) can also be contained in the suspending fluid. Additional charge control agents can also be added to the suspending fluid.

Useful organic solvents include, but are not limited to, epoxides, such as decane epoxide and dodecane epoxide; vinyl ethers, such as cyclohexyl vinyl ether and DECAVE® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the ISOPAR® series (Exxon, Houston, Tex.), NORPAR® (a series of normal paraffinic liquids), SHELL-SOL® (Shell, Houston, Tex.), and SOL-TROL® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), GALDEN® (a perfluorinated ether from Ausimont, Morristown, N.J.), or KRYTOX® from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The non-polar fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It some embodiments, the non-polar fluid will include an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

In general, it is believed that charging results as an acid-base reaction between some moiety present in the continuous phase and the particle surface. Thus useful materials are those which are capable of participating in such a reaction, or any other charging reaction as known in the art.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See US Patent Publication No. 2002/0180687, the entire disclosure of which is herein incorporated by reference.

The synthesis of an exemplary second charge control agent is demonstrated in the example below. The procedure may be followed with appropriate reagents to prepare other polyisobutylene compounds of the invention.

medium included some amount of SOLSPERSE™ 1900 (Lubrizol Corporation) a commercial pigment dispersant. In some of the formulations, the amount of SOLSPERSE™ was varied. In other formulations, the amount of SOLSPERSE™ was held constant, while the amount of polyisobutylene-quaternary amine sulfate was varied.

Each formulation was sandwiched between two electrode plates (one of which is light-transmissive) and the cell was sealed to make a test cell. The test cells were driven to different color states using identical drive schemes. After being driven to the desired color state, optical reflectivity measurements were made with an i1Display Pro™ display calibration instrument (X-Rite, Inc.) and recorded. The data, in L*-a*-b* nomenclature, are shown in Table 1, below. In Table 1, WL* is brightness when the test cell is driven to its whitest state; Wa* is the tint on the white state, with "0" being the most neutral white; RL* is the brightness when the test cell is driven to its reddest state; Ra* is the projection on the red-to-green a* axis when the test cell in its reddest state, with "100" being most red; YL* is the brightness when the test cell is driven to its yellowest state; and Yb* is the projection on the yellow-to-blue b* axis when the test cell in its yellowest state, with "100" being most yellow.

TABLE 1

Color calibration measurements made on test cells having a variety of electrophoretic fluids.

|  |  | Fluid A | Fluid B | Fluid C | Fluid D | Fluid E | Fluid F |
|---|---|---|---|---|---|---|---|
|  | SOLSPERSE | 0.15% wt | 0.15% wt | 0.15% wt | 0.1% wt | 0.2% wt | 0.25% wt |
|  | PIB-Quat CCA | 0.20% wt. | 0.10% wt. |  | No PIB-Quat CCA |  |  |
| White | WL* | 62.3 | 63.7 | 63.3 | 65.6 | 65.4 | 64.2 |
|  | Wa* | −2.5 | −2.5 | −2.5 | −1.8 | −1.9 | −1.9 |
| Red | RL* | 30.3 | 29.2 | 27.9 | 29.0 | 35.7 | 39.2 |
|  | Ra* | 38 | 37.9 | 33.9 | 37.6 | 27.4 | 24.7 |
| Yellow | YL* | 57.9 | 58.2 | 55.9 | 61.0 | 61.8 | 62.4 |
|  | Yb* | 63.2 | 60.5 | 53 | 25.2 | 24.5 | 25.5 |

EXAMPLE

Part A:

Synthesis of polyisobutylene quaternary amine salt: Dimethyl sulfate (115 mL, 6.5 eq. based on the active amine, Sigma-Aldrich) was added dropwise over 40 minutes to a mixture of KEROCOM® PIBA 03 (polyisobutylene amine) (192 g, BASF) and potassium carbonate (85.0 g, 3.3 eq, Acros Organics) in a mixture of methanol and tetrahydrofuran (5:1, 385 mL) under inert atmosphere at 40° C. with vigorous stirring. After two hours, the mixture was cooled to room temperature, and stirred for an additional 16 hours. The mixture was then partitioned between hexane and water. The organic phase was separated, filtered, and concentrated yielding 223 g of very viscous colorless or light-yellow oil that was used in Part B below. Using NMR, the identity of the material produced was confirmed to be polyisobutylene quaternary amine sulfate salt of formula (I), specifically wherein L is —$CH_2$—$CH_2$—$CH(CH_3)$—, $R^1$, $R^2$ and $R^3$ are methyl, and the counter ion is $CH_3$'$SO_4^-$.

Part B:

The polyisobutylene-quaternary amine sulfate compound synthesize above was added to a series of electrophoretic fluids comprising ISOPAR® (Exxon Mobil) and four types of different color charged particles (black, white, red, and yellow). The pigment particles were surface-functionalized as described in WO2015/013279, which is incorporated herein by reference in its entirety. Each electrophoretic Electrophoretic fluids including polyisobutylene-quaternary amine compounds showed better color saturation for both red and yellow color states. Compare, e.g., the Ra* and Yb* values for Fluid B and Fluid F. Despite Fluid B and Fluid F having the same total CCA loading (0.25% wt.), the formulations including both the SOLSPERSE and the polyisobutylene-quaternary amine compounds had better color saturation. The difference between the formulations was particularly pronounced for the yellow states. The difference between the yellow color in Fluid B and Fluid F is obvious to the naked eye.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic medium comprising:
    a first set of charged particles;
    a non-polar fluid;
    a first charge control agent comprising a quaternary amine and a branched hydrocarbon tail of between 20 and 1000 carbon atoms in length;

a second charge control agent comprises a species of $(CH_3)_3C-[CH_2-C(CH_3)_2-]_n-L-NR^1R^2R^{3+}X^-$, wherein L is a linking moiety, $R^1$, $R^2$ and $R^3$ are independently alkyl having 1-4 carbon atoms, n is an integer from 2 to 40, and $X^-$ is a counter ion;

wherein the branched hydrocarbon tail of the first charge control agent comprises a polyester or a poly secondary alcohol; and wherein the electrophoretic medium exhibits color saturation in an electrophoretic display.

2. The electrophoretic medium of claim 1, wherein the first charge control agent comprises a polymeric tail formed from monomers, each monomer comprising a carbon-carbon double bond and being at least 14 carbon atoms in length.

3. The electrophoretic medium of claim 1, wherein n is between 5 and 20.

4. The electrophoretic medium of claim 1, wherein L is a saturated or unsaturated alkylene or amide-alkylene chain of 2 to 6 carbon atoms.

5. The electrophoretic medium of claim 1, wherein L is —CRR—CR=CR—CRR—, —CRR—CRR—CRR—, or —NHC(O)—CRR—CRR—CRR—, wherein the R's are independently hydrogen or an alkyl of 1-4 carbon atoms.

6. The electrophoretic medium of claim 1, wherein L is —$CH_2$—$CH_2$—$CH_2$—, —$CH_2$—CH=CH—$CH_2$—, —$CH_2$—$CH_2$—$CH(CH_3)$—, —$CH_2$—$CH(CH_3)$—$CH_2$—, or —NHC(O)—$CH_2$—$CH_2$—$CH_2$—.

7. The electrophoretic medium of claim 1, wherein L is —$CH_2$—$CH_2$—$CH(CH_3)$—.

8. The electrophoretic medium of claim 1, wherein $R^1$, $R^2$ and $R^3$ are methyl.

9. The electrophoretic medium of claim 1, wherein $X^-$ is $F^-$, $Cl^-$, $Br^-$, $I^-$, $R'SO_3^-$, $R'SO_4^-$ or $R'CO_3^-$, wherein R' is an alkyl of 1-4 carbon atoms or an aryl of 6 to 18 carbon atoms optionally substituted with an alkyl of 1-4 carbon atoms.

10. The electrophoretic medium of claim 1, wherein $X^-$ is $R'SO_3^-$ wherein R' is a phenyl optionally substituted with an alkyl of 1-4 carbon atoms.

11. The electrophoretic medium of claim 1, wherein L is —$CH_2$—$CH_2$—$CH(CH_3)$—, $R^1$, $R^2$, and $R^3$ are methyl, and the counter ion is $CH_3SO_4^-$.

12. The electrophoretic medium of claim 1, wherein the concentration of the first charge control agent is 0.05% to 0.6% by weight of the electrophoretic medium.

13. The electrophoretic medium of claim 1, wherein the concentration of the second charge control agent is 0.05% to 0.6% by weight of the electrophoretic medium.

14. The electrophoretic medium of claim 1, wherein the total concentration of both the first and second charge control agents is between 0.1% and 0.4% by weight of the electrophoretic medium.

15. The electrophoretic medium of claim 1, wherein the ratio of first charge control agent to second charge control agent is from 5:1 to 1:5.

16. The electrophoretic medium of claim 15, wherein the ratio of first charge control agent to second charge control agent is from 2:1 to 1:2.

17. The electrophoretic medium of claim 1, further comprising a second set of charged particles dispersed in the non-polar fluid, wherein the first and second sets of charged particles have opposite charges.

18. The electrophoretic medium of claim 17, further comprising a third set of charged particles dispersed in the non-polar fluid, wherein the third set of charged particles is not white and not black.

19. The electrophoretic medium of claim 18, wherein the third set of charged particles is yellow or red.

\* \* \* \* \*